(12) United States Patent
Edwards et al.

(10) Patent No.: US 11,975,574 B2
(45) Date of Patent: May 7, 2024

(54) TIRE/WHEEL ASSEMBLY FOR A SUPPORT STRUCTURE

(71) Applicant: The Goodyear Tire & Rubber Company, Akron, OH (US)

(72) Inventors: Steven Amos Edwards, Akron, OH (US); Michael Scott Deem, Kent, OH (US); Ceyhan Celik, Stow, OH (US); Arun Kumar Byatarayanapura Gopala, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 133 days.

(21) Appl. No.: 17/552,417

(22) Filed: Dec. 16, 2021

(65) Prior Publication Data
US 2023/0191838 A1 Jun. 22, 2023

(51) Int. Cl.
*B60C 7/26* (2006.01)
*B60C 7/14* (2006.01)

(52) U.S. Cl.
CPC .............. *B60C 7/26* (2013.01); *B60C 7/146* (2021.08)

(58) Field of Classification Search
CPC ........... B60C 7/26; B60C 7/146; B60C 7/143; B60B 25/00; B60B 25/002; B60B 25/006; B60B 25/04; B60B 25/08; B60B 25/20
See application file for complete search history.

(56) References Cited

U.S. PATENT DOCUMENTS

| | | | |
|---|---|---|---|
| 10,207,544 B2 | 2/2019 | Celik et al. | B60C 7/14 |
| 10,286,725 B2 | 5/2019 | Celik et al. | B60B 9/04 |
| 10,406,852 B2 | 9/2019 | Celik et al. | B60B 9/00 |
| 10,457,094 B2 | 10/2019 | Celik et al. | B60B 15/12 |
| 10,603,956 B2 | 3/2020 | Celik et al. | B60C 7/26 |
| 11,110,749 B2 | 9/2021 | Celik et al. | B60C 7/06 |
| 2012/0205017 A1 | 8/2012 | Endicott | |
| 2019/0152256 A1* | 5/2019 | Hwang | B60B 25/20 |
| 2019/0299709 A1* | 10/2019 | Celik | B60B 3/10 |
| 2020/0171884 A1* | 6/2020 | Lee | B60C 7/18 |
| 2021/0061010 A1 | 3/2021 | Van Riper et al. | |
| 2021/0323353 A1 | 10/2021 | Stark | |
| 2022/0176734 A1 | 6/2022 | Celik et al. | |

OTHER PUBLICATIONS

European Search Report for Serial No. EP22212399 dated May 10, 2023.

* cited by examiner

*Primary Examiner* — Kip T Kotter
(74) *Attorney, Agent, or Firm* — June E. Rickey; Robert N. Lipcsik (57) ABSTRACT

A tire and wheel assembly includes a tire, a circular hub member for securing to a rotatable axle of a vehicle, the rim piece having a first annular ring flange for engaging the tire, a rim piece for engaging the hub member, a second annular ring flange for engaging the tire, and a plurality of cylindrical shafts for each axially engaging the first annular ring flange at one axial end of each of the shafts and the second annular ring flange at another opposite axial end of each of the shafts.

8 Claims, 7 Drawing Sheets

TIRE/WHEEL ASSEMBLY FOR A SUPPORT STRUCTURE

FIELD OF INVENTION

The present invention relates to wheel/tire assemblies, and more particularly, to non-pneumatic tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire.

Definitions

As used herein and in the claims:

"Annular" means formed like a ring.

"Axial" and "axially" refer to lines or directions that are parallel to the axis of rotation of the tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Cut shearband ply" refers to a shearband having a width less than the tread width, which lies flat over the carcass plies in the crown area of the tire.

"Crown" means that portion of the tire in the proximity of the tire tread.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Footprint" means the contact patch or area of contact of the tire tread with a flat surface at zero speed and under normal load and pressure.

"Inner" means toward the inside of the tire and "outer" means toward its exterior.

"Inboard side" means the side of the tire nearest the vehicle when the tire is mounted on a wheel and the wheel is mounted on the vehicle.

"Lateral" means an axial direction.

"Load range" means load and inflation limits for a given tire used in a specific type of service as defined by tables in The Tire and Rim Association, Inc.

"Net contact area" means the total area of ground contacting elements between defined boundary edges as measured around the entire circumference of the tread.

"Normal load" means the specific design inflation pressure and load assigned by the appropriate standards organization for the service condition for the tire.

"Outboard side" means the side of the tire farthest away from the vehicle when the tire is mounted on a wheel and the wheel is mounted on the vehicle.

"Radial" and "radially" mean directions radially toward or away from the axis of rotation of the tire.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall" means that portion of a tire radially between the tread and the bead.

"Spring rate" means the stiffness of tire expressed as the slope of the load deflection curve at a given pressure.

"Stiffness ratio" means the value of a control shearband structure stiffness divided by the value of another shearband structure stiffness when the values are determined by a fixed three point bending test having both ends of the cord supported and flexed by a load centered between the fixed ends.

"Tensile stress" is force expressed in force/cross-sectional area. Strength in psi=12,800 times specific gravity times tenacity in grams per denier.

"Tension" for a cord means force on the cord expressed as mN/tex.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Vertical deflection" means the amount that a tire deflects under load.

SUMMARY OF THE INVENTION

A tire and wheel assembly includes a tire, a circular hub member for securing to a rotatable axle of a vehicle, the rim piece having a first annular ring flange for engaging the tire, a rim piece for engaging the hub member, a second annular ring flange for engaging the tire, and a plurality of cylindrical shafts for each axially engaging the first annular ring flange at one axial end of each of the shafts and the second annular ring flange at another opposite axial end of each of the shafts.

According to another aspect of the tire and wheel assembly, the first ring flange has first circular openings arrayed circumferentially about the first ring piece.

According to still another aspect of the tire and wheel assembly, the second ring flange has second circular openings arrayed circumferentially about the second ring flange.

According to yet another aspect of the tire and wheel assembly, each of the first circular openings of the rim piece is axially aligned with a corresponding first bore hole of one of the shafts.

According to still another aspect of the tire and wheel assembly, each of the shafts has a radially outer surface for engaging corresponding loops of the tire.

According to yet another aspect of the tire and wheel assembly, each radially outer surface of each shaft engages a corresponding loop of the tire.

According to still another aspect of the tire and wheel assembly, each shaft engages a cylindrical inner radial surface of a corresponding loop of the tire.

According to yet another aspect of the tire and wheel assembly, the rim piece and ring flanges are constructed of a metal.

According to still another aspect of the tire and wheel assembly, the rim piece and ring flanges are constructed of a polymer.

A method for non-pneumatically supporting a vehicle load includes the steps of: axially engaging first axial ends of a plurality of the shafts with a first bolt member; axially and radially engaging loop members of a tire with corresponding radially outer surfaces of each of the shafts; axially engaging second opposite ends of the shafts with a second bolt member; threadedly securing the first bolt members secured through a corresponding first bore hole of one of the shafts; threadedly securing the second bolt members through a corresponding opposite second bore hole of one of the shafts; securing a circular hub member to the rim piece; and rotationally attaching the circular hub member to a vehicle.

According to another aspect of the method, a further step includes arraying first circular openings circumferentially about the first ring flange.

According to still another aspect of the method, a further step includes arraying second circular openings circumferentially about the second ring flange.

According to yet another aspect of the method, a further step includes engaging radial outer surface of loops of a tire with the shafts.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

An example wheel/tire assembly, such as that described in Applicant's U.S. Pat. Nos. 10,207,544 and 10,603,956, both incorporated herein by reference in their entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel (not shown), and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale tire assemblies. The inner central rim may include steel, cast iron, aluminum, aluminum alloys, magnesium allows, and/or iron alloys.

FIGS. 1 through 8 show a tire/wheel assembly 200 in accordance with the present invention for use with pneumatic and/or non-pneumatic tire assemblies, such as the example tire assembly described above. The tire/wheel assembly 200 may include an annular cylindrical rim piece 210 secured to a hub member 207 and rotatable axle or similar structure of a vehicle (not shown). The rim piece 210 may be constructed of any suitable material, such as metal, polymer, ceramic, and/or a combination thereof. The rim piece 210 may have a first annular ring flange 212 extending circumferentially about one end of the rim piece 210. The first ring flange 212 may further have first circular openings 214 arrayed circumferentially about the ring flange 212.

Figure 1:
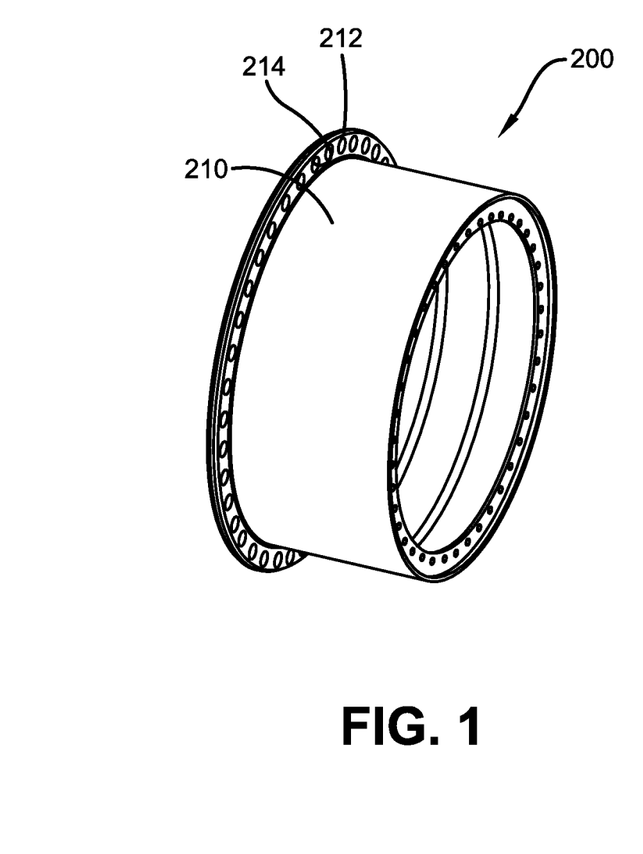
FIG. 1 is a schematic perspective view of an example first part of an example tire/wheel assembly in accordance with the present invention.
Figure 2:
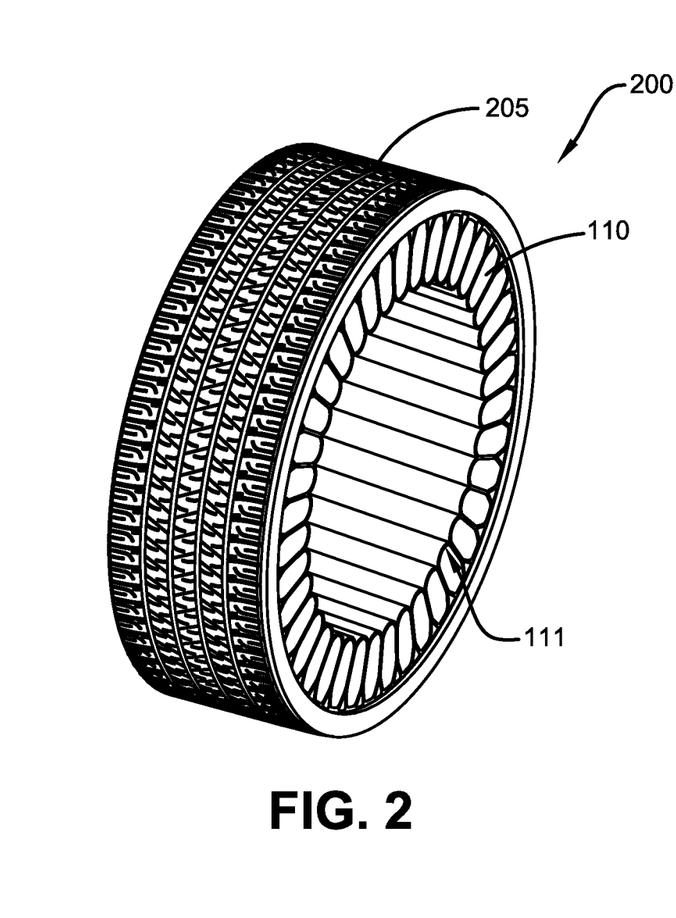
FIG. 2 is a schematic perspective view of an example tire for use with the present in invention.
Figure 3:
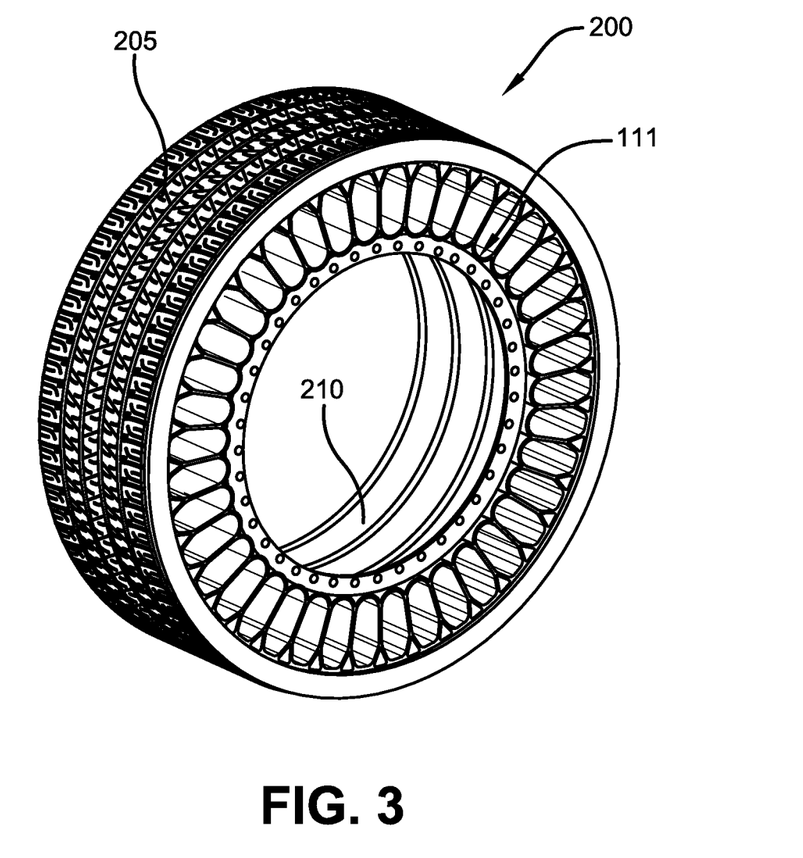
FIG. 3 is another schematic perspective view of the assembled first part of FIG. 1 and example tire of FIG. 2.
Figure 4:
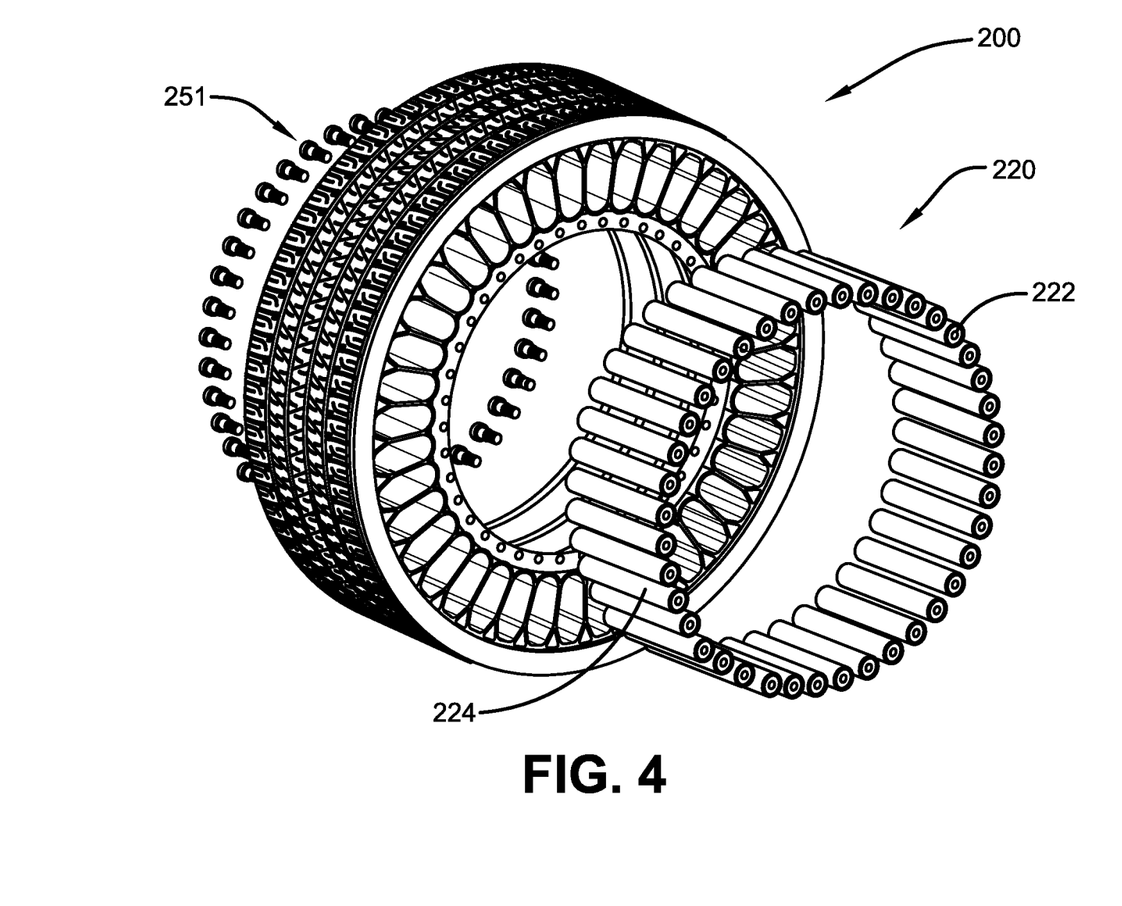
FIG. 4 is an exploded schematic perspective view of part of a tire/wheel assembly in accordance with the present invention.

The tire/wheel assembly 200 may further include a plurality of annular shafts 220 each engaging a corresponding first circular opening 214 of the first ring flange 212. Each shaft 220 may further include two threaded central bore holes 222 extending axially inward from each axial end of each shaft 220. Radially outer surfaces 224 of each of the shafts 220 may engage corresponding loops 111 of a spoke structure 110 of an example tire assembly 205.

Figure 5:
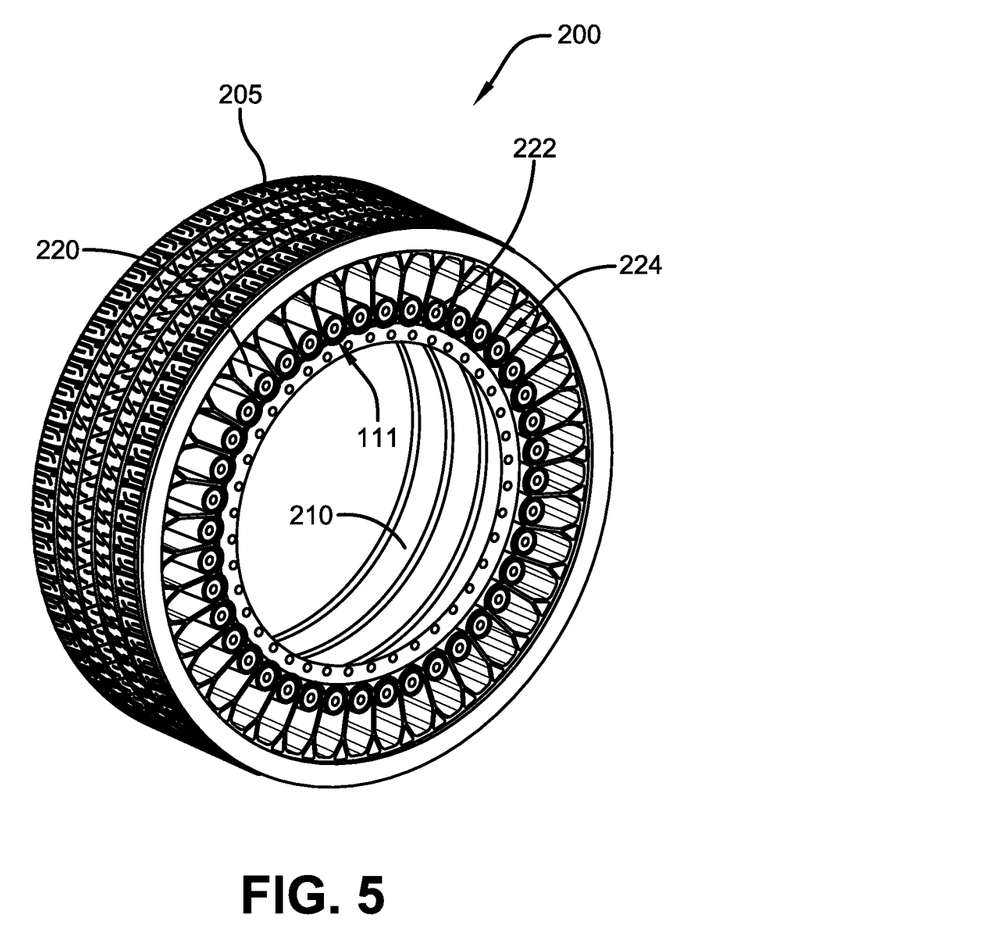
FIG. 5 is a schematic perspective view of the assembled part of the tire/wheel assembly of FIG. 4.

Each corresponding pair of first circular openings/first bore holes 214, 222 may be radially, axially, and circumferentially secured and fixed in these aligned relative positions by a corresponding first bolt member of a plurality of first bolt members 251 thereby sandwiching the loops 111 of the tire 205 between the rim piece 210 and each of the outer surfaces 224 of the shafts 220 (FIG. 5).

Figure 6:
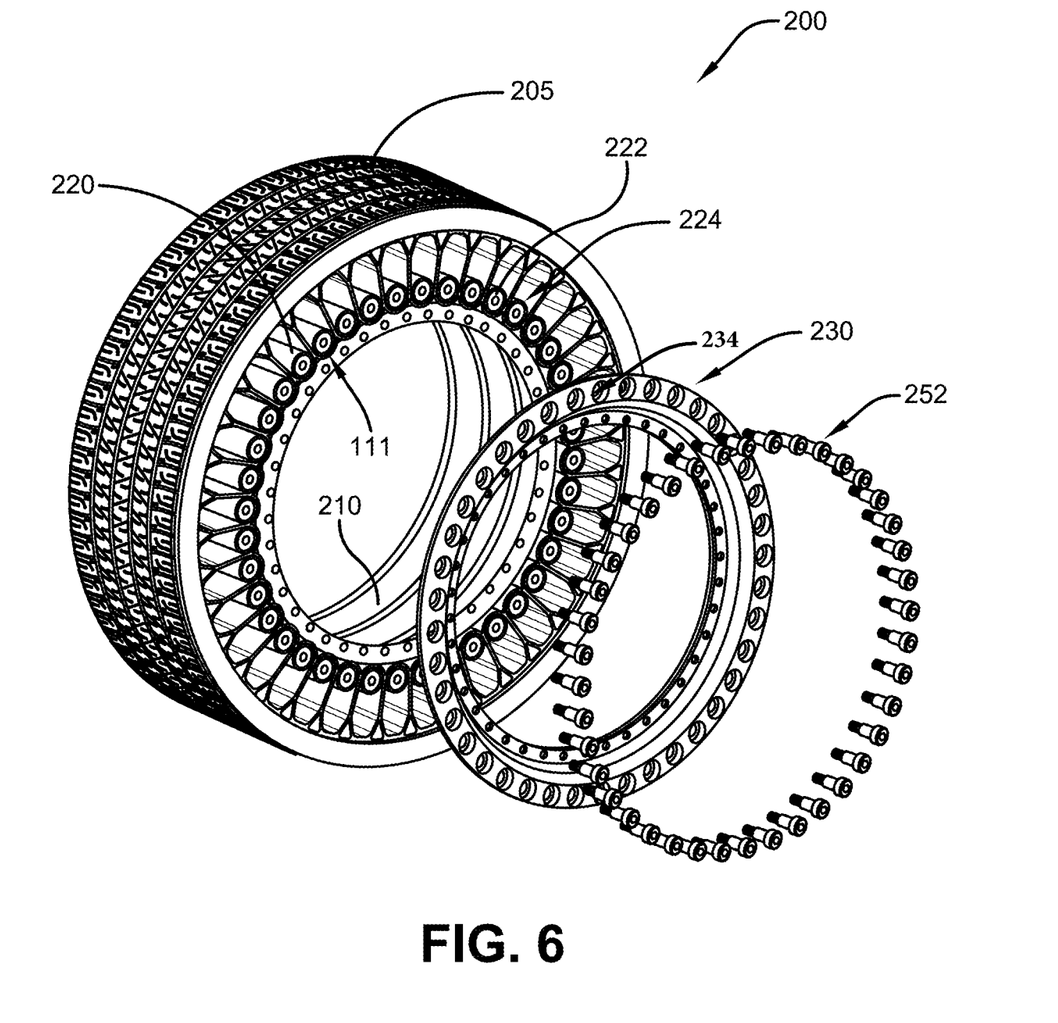
FIG. 6 is an exploded schematic perspective view of the assembled part of wheel/tire assembly of FIG. 5 and another part of a tire/wheel assembly in accordance with the present invention.
Figure 7:
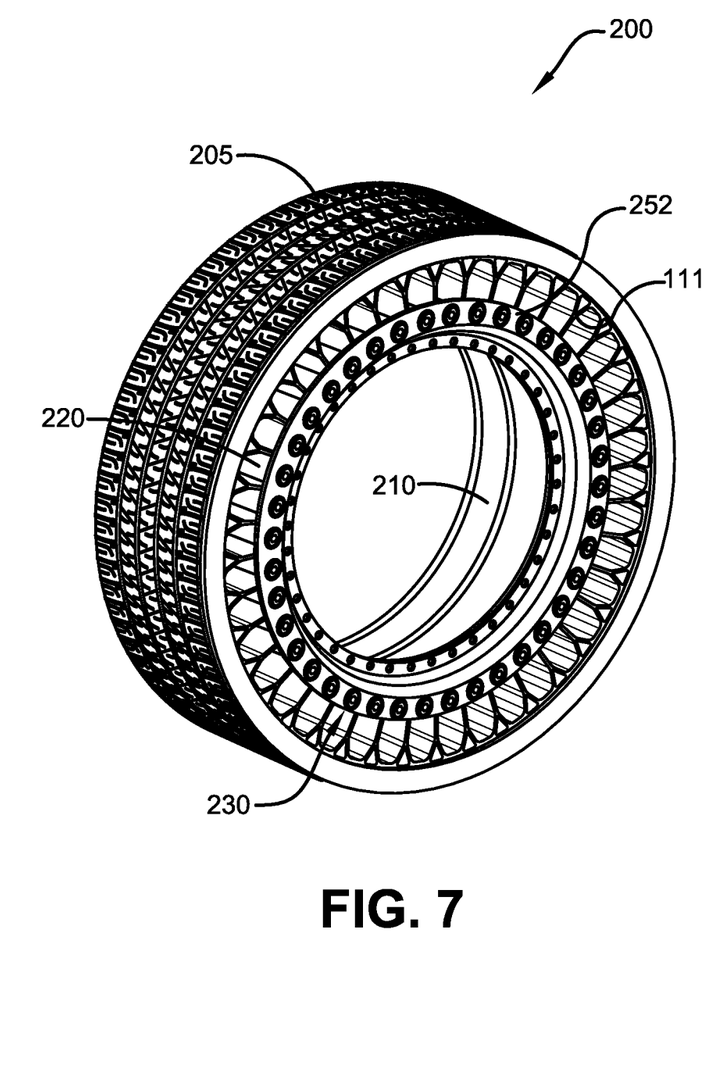
FIG. 7 is a schematic perspective view of the part of the tire/wheel assembly of FIG. 6 in an assembled condition.
Figure 8:
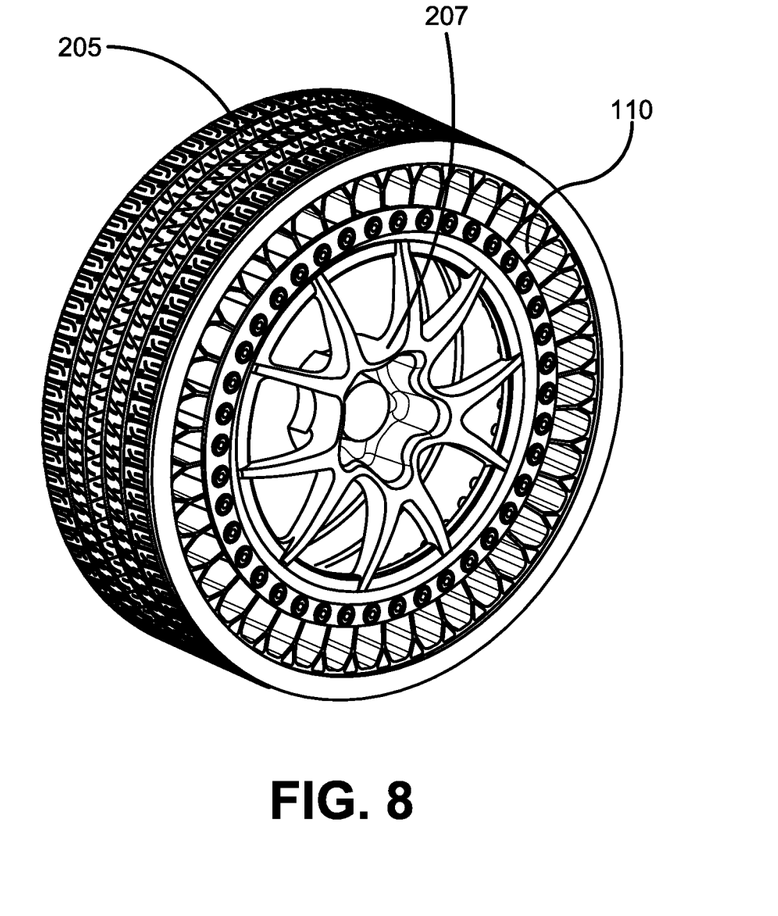
FIG. 8 is schematic perspective view of the tire/wheel assembly of FIG. 7 in an assembled condition.

A second annular ring flange 230 may axially secure the sandwiched loops 111 of the tire 205 to the assembled elements 205, 210, 220 by securing a second bolt member of a plurality of second bolt members 252 through a corresponding second circular opening 234 of a second ring flange 230 to a corresponding opposite threaded bore hole 222 of one of the shafts 220 (FIG. 6). Thus, each corresponding pair of second circular openings/second bore holes 234, 222 may be radially, axially, and circumferentially secured and fixed in these aligned relative positions (FIG. 7). The hub member 207 may then be secured to the tire/wheel assembly 200 (FIG. 8) enabling attachment of the tire assembly 200 to a vehicle (not shown).

A method for non-pneumatically supporting a vehicle load, in accordance with the present invention, may include: a first step such that first axial ends of each of the cylindrical shafts 220 axially engage each of the first bolt members 251; a second step such that loop members 111 of the example tire assembly 205 may each axially and radially engage corresponding radially outer surfaces 224 of each of the shafts 220; a third step such that second opposite ends of each of the cylindrical shafts 220 axially engage a corresponding second bolt member 252; a fourth step such that the first bolt members 251 are each threadedly secured through a corresponding bore hole 222 of one of the shafts 220; a fifth step such that the second 252 are each threadedly secured through a corresponding opposite bore hole 222 of one of the shafts 220; and a sixth step such that a circular hub member 207 is secured (e.g., welded, bolted, interference fit, etc.) to the rim piece 210 allowing rotational attachment to a vehicle (not shown).

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A nonpneumatic wheel assembly comprising:
   an annular spoke structure formed of a plurality of loops and having an interior void and a first and second lateral end;
   an annular rim piece mounted within the interior void of the annular spoke structure and extending the entire axial width of the annular spoke structure,
   the annular rim piece having a first ring flange connected to a first lateral end of the annular rim piece for engaging a first lateral end of the annular spoke structure;
   a second ring flange for engaging a second lateral end of the annular spoke structure; and
   a plurality of cylindrical shafts, wherein each cylindrical shaft is positioned in a respective loop of the annular spoke structure, and wherein a first end of each cylindrical shaft is secured to the first ring flange and a second end is secured to the second ring flange.

2. The tire and wheel assembly as set forth in claim 1 wherein the first ring flange has first circular openings arranged circumferentially about the first ring flange.

3. The tire and wheel assembly as set forth in claim 2 wherein the second ring flange has second circular openings arrayed circumferentially about the second ring flange.

4. The tire and wheel assembly as set forth in claim 3 wherein each of the first circular openings of the rim piece is axially aligned with a corresponding first bore hole of one of the shafts.

5. The tire and wheel assembly as set forth in claim 4 wherein each of the shafts has a radially outer surface for engaging corresponding loops of the tire.

6. The tire and wheel assembly as set forth in claim 1 wherein each shaft engages an inner radial surface of a corresponding loop of the tire.

7. The wheel assembly as set forth in claim 1 wherein the rim piece and ring flanges are constructed of a metal.

8. The wheel assembly as set forth in claim 1 wherein the rim piece and ring flanges are constructed of a polymer.

\* \* \* \* \*